C. W. & A. H. NUSS.
DRUM BEATER.
APPLICATION FILED AUG. 14, 1907.
912,404.
Patented Feb. 16, 1909.
4 SHEETS—SHEET 1.
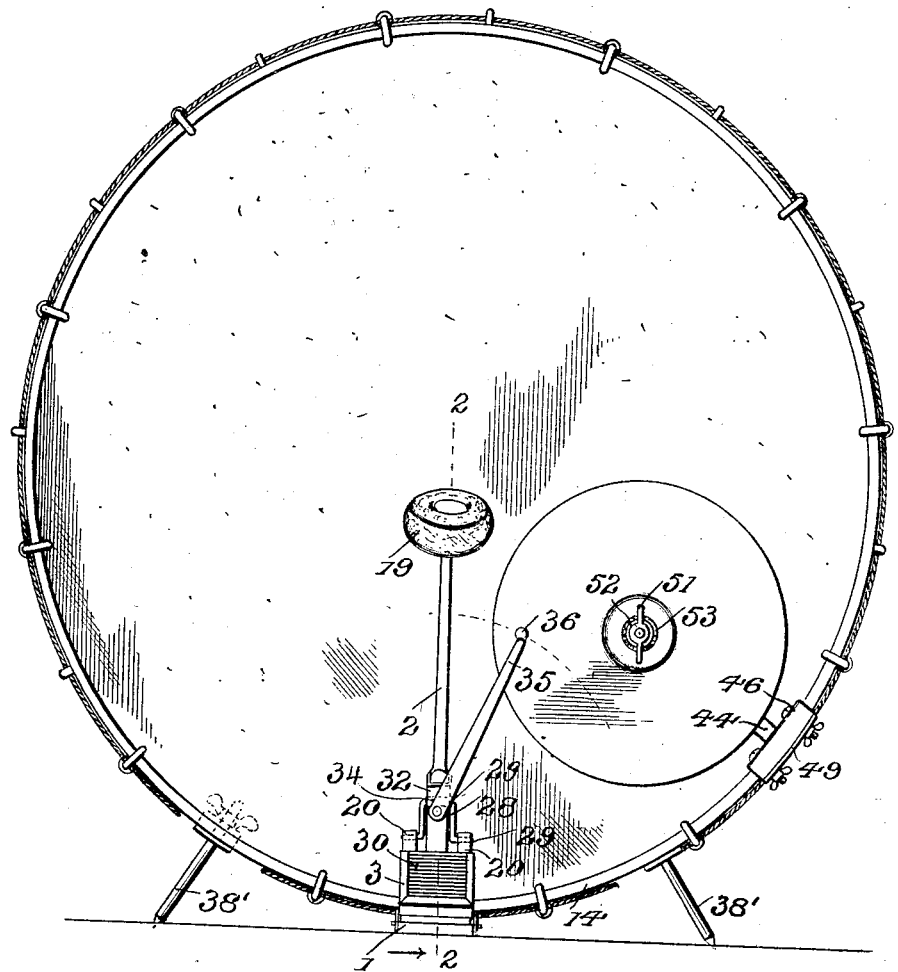
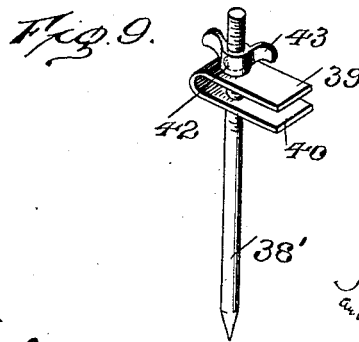

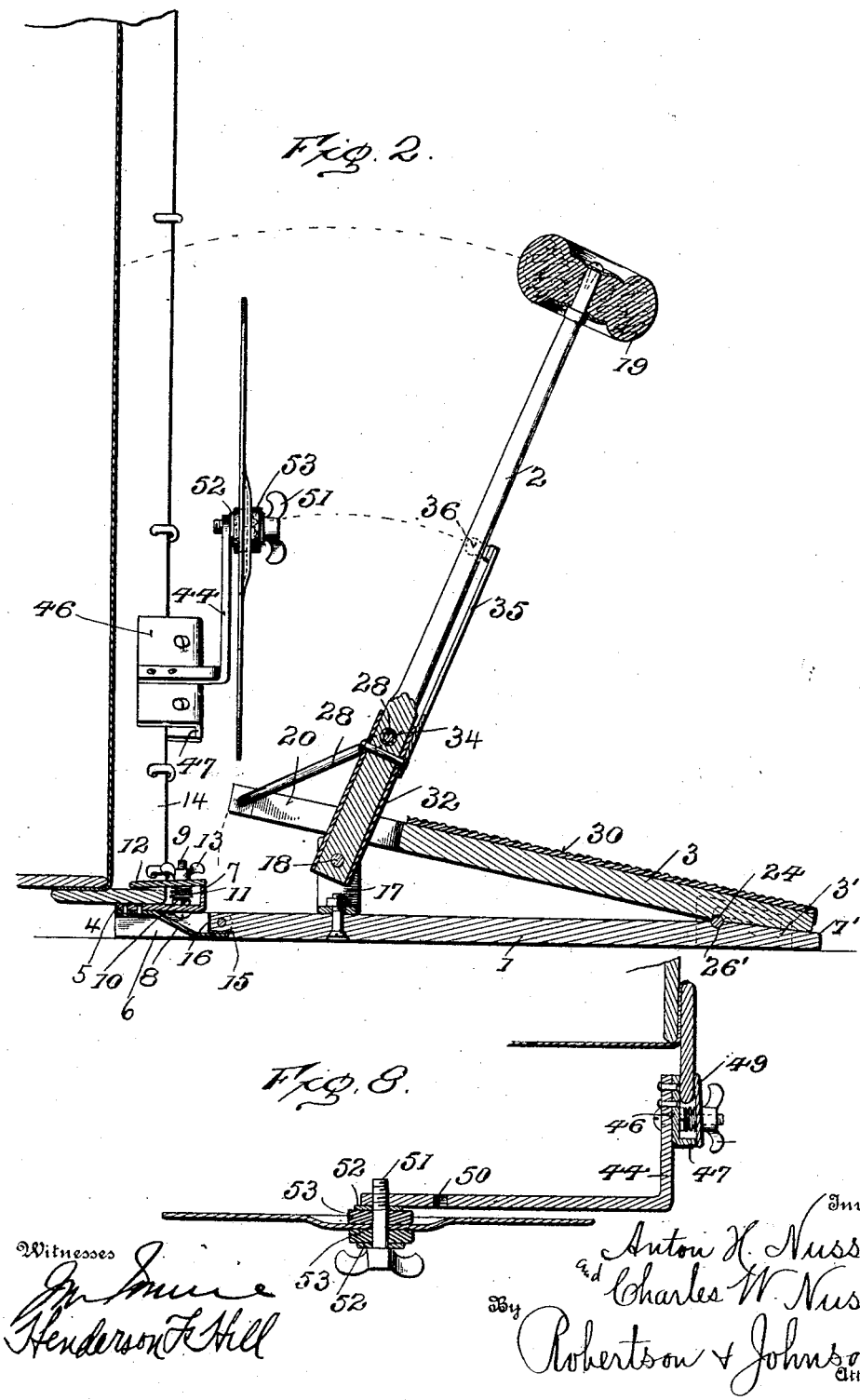

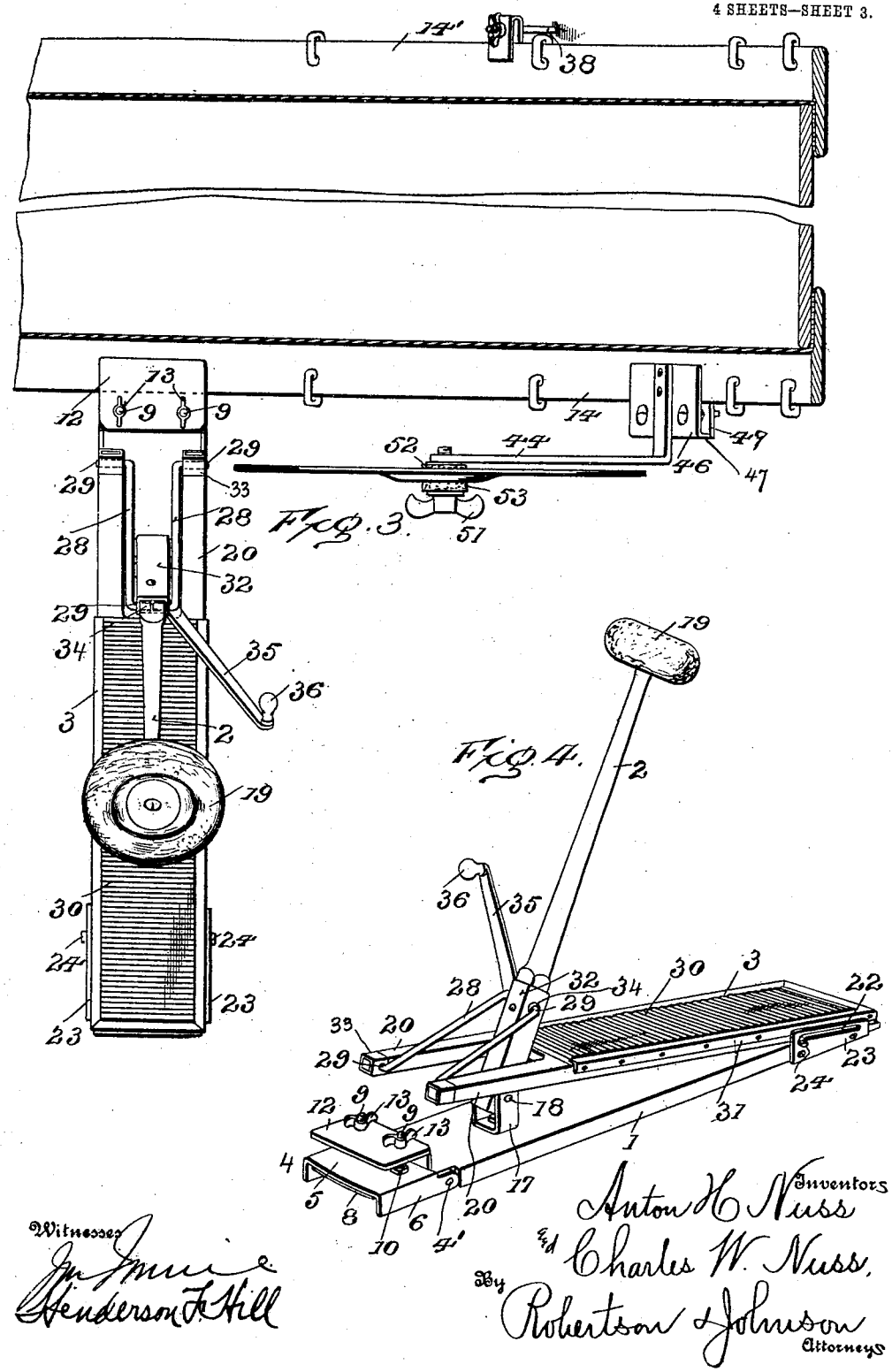

C. W. & A. H. NUSS.
DRUM BEATER.
APPLICATION FILED AUG. 14, 1907.
912,404.
Patented Feb. 16, 1909.
4 SHEETS—SHEET 4.
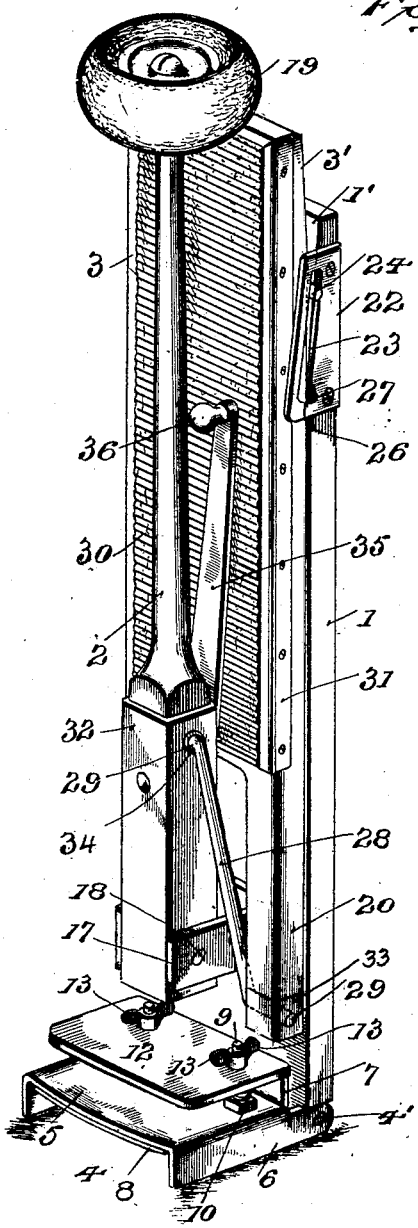
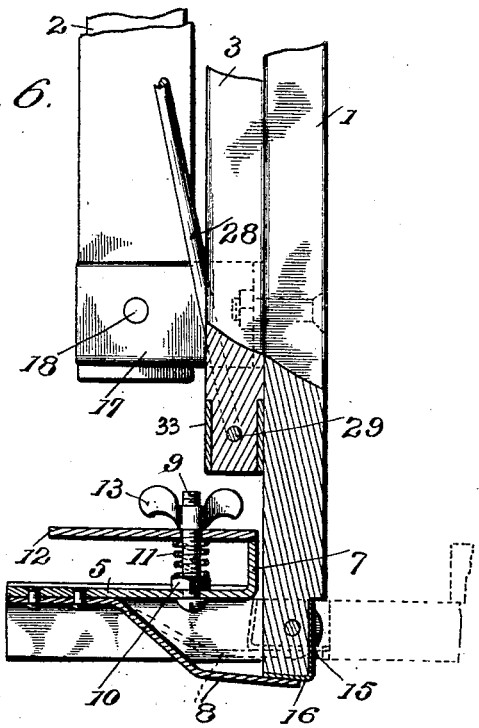
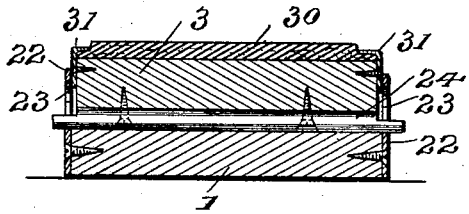
Witnesses
Henderson F. Hill
Inventors
Anton H. Nuss
Charles W. Nuss
By Robertson & Johnson
Attorneys

UNITED STATES PATENT OFFICE.

CHARLES W. NUSS AND ANTON H. NUSS, OF HARRISBURG, PENNSYLVANIA.

DRUM-BEATER.

No. 912,404.   Specification of Letters Patent.   Patented Feb. 16, 1909.

Application filed August 14, 1907. Serial No. 388,495.

*To all whom it may concern:*

Be it known that we, CHARLES W. NUSS and ANTON H. NUSS, both of Harrisburg, in the county of Dauphin and State of Pennsylvania, have invented certain new and useful Improvements in Drum-Beaters, of which the following is a specification.

Our invention relates to drum beater and accessories therefor, and has for its purpose the provision of a collapsible drum beater which is simple and strong, which may be folded against the drum head when not in use and held firmly in this position, and which may be removed from the drum and folded for packing in its case without removing, unscrewing, loosening, or detaching any part of the beater. The adjustment of the cymbal beater is also a feature of the invention and other novel points of importance will appear in the detailed description of the invention.

With this explanatory statement, our invention may be said to consist in the drum beater which is shown in its preferable embodiment in the accompanying drawings and which will be hereinafter described and claimed.

Referring to the drawings: Figure 1 is a face view of a drum with our device attached thereto. Fig. 2 is a vertical longitudinal section showing the beater in position to make the forward strike. Fig. 3 is a transverse section of a drum showing our device attached thereto. Fig. 4 is a perspective view of the beater attachment. Fig. 5 is a perspective view of the drum beater attachment in a folded position ready for packing. Fig. 6 is an enlarged detailed view partly in section of parts of the beater in its collapsed position shown in its entirety in Fig. 5. Fig. 7 is a transverse section through the base, pedal and fulcrum pin. Fig. 8 is a section through the cymbal and its supporting bracket. Fig. 9 is a perspective view of the drum spur.

1 is the base which supports the drum stick 2 and the operating pedal 3.

4 is a clamp pivoted at 4' to the base 1 and by means of which the entire beater is held in position upon the drum. This clamp 4 consists of a plate 5 having side flanges 6 and an upstanding flange 7. This plate may be curved to take the drum hoop more readily. A stiff plate-spring 8 is firmly fastened to the under side of plate 5 by riveting or other suitable means. The plate 5 carries a pair of screw threaded bolts 9 held from turning by nut locks 10 and provided with springs 11. The other member of the clamp is a plate 12 which is capable of being forced down by wing nuts 13 threaded on the bolts 9. This clamp is placed so that its members clamp the drum hoop 14 between them. The end of the base 1 which coöperates with the plate-spring 8 is preferably protected by metal and is cut out somewhat so that when the clamp forms an extension in the plane of the base, the plate-spring is in substantially the same plane as the bottom of the base and the side flanges 6 of the clamp are substantially in the planes of the sides of the base. This, while not absolutely necessary, makes a neater construction. The end of the base has a substantially horizontal face 15 and a face 16 in a plane approximately vertical. By coöperating with these respective faces the plate-spring maintains the beater firmly in its position of use when the plate-spring and the face 15 are in contact, and in its folded position against the head of the drum, when the face 16 is in contact with the plate-spring. In the former position the spring permits the beater base to turn on the clamp to accommodate itself to uneven floors without bending the drum hoop.

A support 17 firmly fastened to the base 1 and which as shown is a U-shaped piece of metal, carries the drum stick 2 rotatably on a pin 18. The drum stick at its other end is provided with a head 19 made of felt or other suitable material.

The operating means for the drum-stick consists of a pedal 3 pivotally mounted on the base 1 and connecting means hereinafter described. As shown this pedal has a forked end consisting of legs 20 between which is mounted the support 17 and which straddle the lower end of the drum stick. This economizes space since the drum stick works in the cut out space between the legs of the pedal, and it is therefore possible to shorten the pedal and the base. The pedal is pivotally and slidably mounted in guides which are conveniently formed by slots 22 in plates 23 fastened to the sides of the base 1 near its rear end. The pedal carries on its under side near its rear end a fulcrum pin 24, preferably half round, which is given this shape in order that it may coöperate in the most effective way with the guide slots 22. Each of these guide slots consists of a straight portion slanting upwardly and forwardly i. e. toward the drum; the lower side of this portion at its forward end being above the upper surface of the base, and a short portion 26 extending down at an angle and having its lower end curved to correspond with the curved surface of the pin and with the concave bearing groove 26' in the base with which the curved ends of the angular slot portions 26 register. The pin 24 may be made to slide freely in the slanting portions of the slots 22, its flat upper face facilitating this action while its rounded under side enables the pin to constitute a fulcrum acting in connection with the groove 26' and the rounded ends 27 of the angular portions 26 of the slots 22.

The ends of the legs 20 are connected with the drum stick 2 between its ends by a yoke 28. This yoke which is generally speaking of U-shape is preferably formed of two pieces with its bent ends passing into bushed openings in the drum stick 2 and has its ends 29 bent at right angles and pivotally mounted in the ends of the legs 20. The pedal turning about the said pin acts through the yoke 28 to pull the drum stick forward turning it about the pin 18 at its lower end. The base 1 and the pedal 3 are provided with beveled portions 1' and 3' respectively at their rear ends which, when the beater is in the position of use, permit the rear end of the pedal to be depressed to withdraw the drum stick from the drum head, and coöperate to act as a stop limiting the return or rearward stroke of the drum stick, the forward stroke being limited by the flat bottom of the pedal coming into contact with the top of the base. This fixes the extreme limits of the stroke without preventing the operator from varying the length or force of the stroke within these limits and makes the beater easier to use.

The operation of the beater which will probably be apparent from the above description is as follows: With the beater clamped to the drum hoop and the parts in the position shown in Fig. 2 where the drum stick 2 is ready for its forward stroke and the fulcrum pin 24 is in the groove 26' and the angular slot portions 26, the operator places his foot on the pedal and presses down with his toe at the same time raising his heel. This causes the pedal to turn on its fulcrum and through the yoke 28 to pull the drum stick against the drum head. Reversing the operation by pressing down the heel and raising the toe returns the parts to their former position.

Should the operator desire to get the beater out of the way or to remove it entirely, he takes hold of the drum stick, turns it back slightly from its position when in readiness for the forward stroke, until the pin 24 is lifted out of the angular slot portions 26, the pedal at this time turning slightly on its rear edge, when the pin slides freely in the slanting slot portions 23, the parts collapsing by their own weight into the flat position as shown in Fig. 5. In practice a too abrupt collapse is prevented by simply laying down the drum stick. No parts need be removed or even loosened, and the beater may be collapsed while still clamped to the drum.

When the beater is to be packed, it is collapsed and unclamped from the drum. The clamp 4 is then turned up to shorten the base and the folded apparatus is placed in its case.

When it is desired to keep the beater on the drum but to get it out of the way temporarily, it is collapsed by folding it on the clamp 4 around the pivot 4' up against the drum head in which position it is firmly held by the coaction of the plate-spring 8, and the face 16 at the end of the base.

When collapsed the beater may be readily set up by sliding the pedal forward until the fulcrum pin reaches the groove 26'.

The treadle 3 is suitably provided with a corrugated rubber facing 30 to prevent the foot from slipping and this facing is retained in position by a metal binding strip 31. The wearing parts are preferably protected by metal, that is, the lower end of the drum stick 2 is surrounded by a metal casing 32 and the ends of the legs 20 are surrounded by similar casings 33. The drum stick 2 is provided with a bushing 34 in which turns the ends of yoke 28.

A cymbal is attached to the drum hoop in proximity to the drum beater and is played by a cymbal beater 35 rotatably mounted on the drum stick 2. As shown the cymbal beater is pivoted at the back of the drum stick by means of a pin attached to the beater passing through the drum stick in which it fits frictionally to retain adjustments. The cymbal beater carries a beater head 36. By reason of the fact that the drum stick when striking the drum head is not in the plane thereof or in a plane parallel thereto, but slants towards said head, the distance between the cymbal beater and the cymbal may be altered by turning the cymbal beater on its pivot so that it may be made to strike the cymbal with the degree of force desired or not to strike it at all. The cymbal beater is sufficiently flexible to permit it to be turned to either side of the drum stick.

The beater itself when attached to the hoop 14 on one of the drum heads serves as a flat supporting surface. In order to hold the drum firmly, however, drum spurs 38' are provided for attachment to the drum hoop 14' on the opposite side of the drum at points on each side of the line occupied by the beater. These spurs when clamped to the drum hoop, with the beater base, form a tripod whereby the drum is firmly supported. These spurs which we believe to be novel are constructed as follows: A pin 38' having one end pointed and the other end screw-threaded carries a U-shaped clamp 39, the lower leg of which 40 is screw-threaded to correspond with the pin, and the upper leg of which 41 is provided with a hole 42 of greater diameter than that of the pin 38'. A wing nut 43 screw-threaded on the pin serves to force the upper leg toward the lower and clamp the drum hoop which is placed between them. The resiliency of the metal makes this effective and causes a prompt release of the clamping action on the unscrewing of the wing nut. Owing to the fact that the pin 38' is screw-threaded for quite a distance, we are enabled not only to use the screw threads in connection with the wing nut 43 to secure the clamp 39 to the drum hoop, but the screw threads also permit of an adjustment of the clamp 39 on the pins 38'.

Another advantage of the construction shown in Fig. 9 is that when the clamp is applied to the drum, the pin itself does not come in contact with the hoop and therefore cannot injure it.

The cymbal is supported by a bracket 44 having a clamp similar to the clamp 4 already described but not identical therewith. It has a plate 46 having an upstanding flange 47, a plate 49 forming the other member of the clamp and other clamping mechanism substantially like that of the clamp 4 above described. To the plate 46 the bracket 44 is fastened. This standard has a plurality of screw-threaded holes 50 near its end which carry a wing bolt 51 on which are a pair of metal washers 52 acting against the metal parts and a pair of leather washers 53 between which the cymbal is clamped by the action of the wing bolt. The position of the cymbal may be varied by placing the clamp constituted by the wing bolt and washers in a different hole. This bracket may be clamped to the drum hoop at the desired location.

What we claim as new is:

1. In a drum beater, a drum-stick, a base, and operating means, said parts being foldably arranged in operative relation to each other and being movable from the position of use to the folded position by merely laying down the drum-stick.

2. In a drum beater, a drum stick, a base, operating means, and means connecting said parts constructed to maintain them normally in the position of use but to permit them to assume the folded position by merely laying down the drum stick.

3. In a drum beater, a base, a drum stick, pivoted thereon, a pedal mounted to rock on said base, said parts provided with means which are adapted to maintain the parts normally in the position of use but to permit the pedal and the drum stick to be laid flat upon the base.

4. In a drum beater, a base, a drum stick pivoted thereon, and operating means mounted to rock on said base and capable of sliding with respect thereto, whereby the beater is rendered collapsible.

5. In a drum beater, a base, a drum stick pivoted thereon, a pedal fulcrumed on said base, operative connections permitting the parts to fold flat upon each other without removing or dismantling any part.

6. In a drum beater, a base, a drum stick pivoted thereon, a pedal fulcrumed on said base, a yoke pivoted both to the drum stick and to the pedal and forming the operative connection between them, and means to retain said fulcrum in operative position and to permit its removal therefrom to allow the beater to collapse.

7. In a drum beater, a base, a drum stick pivoted thereon, a pedal fulcrumed on said base, operative connections between said pedal and drum-stick, a fulcrum carried by said pedal, guides having a part in which said fulcrum may rock without movement lengthwise of the base, and a part in which it may slide lengthwise of the base whereby the beater is rendered collapsible.

8. In a drum beater, a base, a drum stick pivoted thereon, a pedal fulcrumed on said base, a yoke pivoted both to the drum stick and to the pedal and forming the operative connection between them, the fulcrum consisting of a half round pin, a rounded groove in which said pin works, guides for the ends of said pin having extensions registering with said groove and portions in which the ends of said pin may slide whereby the beater is rendered collapsible.

9. In a drum beater, a base, a drum stick pivoted thereon, a pedal fulcrumed on said base and having a forked end straddling said drum stick, and a yoke pivotally connected both to the forward and straddling end of the pedal and to the drum stick above its pivot.

10. In a drum beater, a base, a drum stick pivoted thereon, a pedal fulcrumed on the base, means normally retaining the fulcrum in the position of use but permitting it to move therefrom in the collapse of the beater, and operative connections between said drum stick and pedal, said pedal and base being provided with beveled surfaces which coöperate to limit the swing of the drum stick in the normal operation of the beater and which in the collapse of the beater coöperate to alter the position of the fulcrum to permit this action.

11. In a drum beater, a base, a drum-stick pivoted thereon, a pedal normally a lever of the third order, and means maintaining it normally as such but in the collapse of the beater automatically permitting the changing of the fulcrum of said pedal so that it may become a lever of the second order and permitting the collapse of the parts.

12. In a drum beater, a base, a drum-stick pivoted thereon, a pedal fulcrumed on said base, means normally acting to prevent endwise movement of the fulcrum, but constructed to permit such movement when the fulcrum is abnormally raised.

13. In a drum beater, a base, a drum-stick pivoted thereon, a pedal operatively connected to the drum-stick and fulcrumed on the base, coöperating means on said base and pedal for moving the fulcrum out of its normal position, and means normally retaining the fulcrum in the position of use but permitting it to move therefrom on the operation of said coöperating means in the collapse of the other parts upon the base.

14. In a drum beater, a base, a drum-stick pivoted thereon, a pedal linked to the drum-stick and fulcrumed on the base, and means to retain the fulcrum normally in operative position but to permit it to move endwise when raised out of operative position, the rear end of the base and the rear end of the pedal being beveled to coöperate as a stop in normal use and as a fulcrum to raise the normal fulcrum out of operative position to permit it to move endwise, when the beater is being caused to collapse.

15. In a drum beater, a pivoted drum stick, means for operating the same, and a clamp for attaching the beater to the drum, said beater being collapsible while still attached to said drum.

16. In a drum beater, a clamp for attachment to the drum, a beater pivoted thereon and capable of being folded flat against the drum head, and means for retaining the beater in this position.

17. In a drum beater, a base, a drum stick pivoted thereon, a pedal fulcrumed on said base, operative connections between said pedal and drum stick, said parts being foldable upon said base, a clamp pivoted to the end of the base, a plate-spring on said clamp coöperating with the bottom of the base end or with its front edge to retain the beater yieldably in normal position or folded against the drum head respectively.

18. In a drum beater, a clamp for attachment to the drum, a beater pivoted thereto and comprising a base, a pedal, and a drum stick both pivoted on said base and collapsible upon it, and a spring carried by said clamp for holding the beater in collapsed position against the drum head.

19. In a drum beater, a pivoted drum-stick, a cymbal beater, capable of adjustment and retention in different positions of use, said cymbal beater being mounted on the drum-stick for rotation in substantially that plane thereof at right angles to its path, means for retaining said cymbal beater in different angular positions, and means for operating said drum-stick and beater.

20. In a drum beater, a pivoted drum stick, a cymbal beater frictionally pivoted upon said drum stick for rotation in substantially that plane of the drum-stick at right angles to the path thereof and for adjustment in various positions to control the force of the stroke on the cymbal, and means for operating said drum stick and beater.

21. In a drum beater, a base, a drum-stick pivoted thereon, a pedal, and operative connections between said pedal and drum-stick, said base and pedal being provided one with a fulcrum and the other with guides, said guides having a part between which and the fulcrum there may be a rocking without relative movement lengthwise of the base, and a part between which and the fulcrum there may be relative sliding lengthwise of the base, whereby the beater is rendered collapsible.

22. In a drum beater, a pivoted drum stick, a pivoted pedal, operative connections therebetween, the weights of said drum stick and pedal being normally in opposition and means normally maintaining this relation but permitting the changing of the relative position of the respective centers of gravity of said drum stick and pedal to cause the weights of the said parts to act in the same sense in the collapse of the beater.

Signed by us at Harrisburg, Pa. this ninth day of August 1907.

CHAS. W. NUSS.
ANTON H. NUSS.

Witnesses:
STEPHEN HUBERTIS,
JOHN H. HORNER.